(12) United States Patent
Tose et al.

(10) Patent No.: US 6,191,186 B1
(45) Date of Patent: Feb. 20, 2001

(54) INSULATING PASTE

(75) Inventors: Makoto Tose, Moriyama; Shizuharu Watanabe, Omihachiman, both of (JP)

(73) Assignee: Murata Manufacturing Co. Ltd. (JP)

( * ) Notice: Under 35 U.S.C. 154(b), the term of this patent shall be extended for 0 days.

(21) Appl. No.: 09/165,476

(22) Filed: Oct. 2, 1998

(30) Foreign Application Priority Data

Oct. 17, 1997 (JP) .................................................. 9-285050

(51) Int. Cl.[7] .................................................. C08K 2/46
(52) U.S. Cl. ........................... 522/83; 428/323; 428/325; 428/331; 522/85; 523/200; 523/214; 523/216; 523/217; 524/442; 524/492; 524/493; 524/494; 525/254
(58) Field of Search ..................................... 524/442, 492, 524/493, 494; 525/254; 523/200, 214, 216, 217; 428/402, 403, 404, 406, 407, 323, 325, 331; 522/83, 85

(56) References Cited

U.S. PATENT DOCUMENTS

| | | | |
|---|---|---|---|
| 5,134,175 | * | 7/1992 | Lucey ...................................... 522/76 |
| 5,766,741 | * | 6/1998 | Kawakami et al. .................. 428/210 |
| 5,914,216 | * | 6/1999 | Amou et al. ....................... 430/280.1 |

* cited by examiner

*Primary Examiner*—D. S. Nakarani
(74) *Attorney, Agent, or Firm*—Ostrolenk, Faber, Gerb & Soffen, LLP

(57) ABSTRACT

The invention provides an insulating paste, comprising: an organic vehicle containing an organic binder, a photopolymerization initiator and a photosetting monomer; and a silicate glass powder having a softening point in a range of about 700° C. to 1,050° C. and having an average particle size in a range of about 0.1 to 5.0 μm, said silicate glass powder being dispersed into said organic vehicle. Preferably, the silicate glass powder of the above insulating paste comprises a composition represented by $xSiO_2$—$yB_2O_3$—$zK_2O$ where $x+y+z$ is 100 parts by weight and the values z, y and z are on lines or within a region enclosed by lines passing through four points A(65, 35, 0), B(65, 20, 15), C(85, 0, 15) and D(85, 15, 0) on a ternary diagram thereof.

14 Claims, 1 Drawing Sheet

INSULATING PASTE

BACKGROUND OF THE INVENTION

1. Field of the Invention

The present invention relates to an insulating paste, and particularly relates to an insulating paste containing glass powder which is suitably used for forming an electrically insulating layer for high-frequency circuits.

2. Description of the Related Art

With trends towards high density and high speed in high-frequency electronic devices, electrically insulating materials which are associated with high-frequency circuits in these electronic devices are required to have a high dielectric constant and a high Q value. Such electrically insulating materials are used for forming electrically insulating layers which isolate two or more electrodes or transmission lines in, for example, high-frequency circuit substrates or electronic parts for high-frequency circuits.

Holes for electrically connecting upper and lower electrodes or transmission lines through conductive members, that is, via-holes, are often provided in the electrically insulating layer. In the formation of the electrically insulating layer having via-holes, for example, an insulating paste containing glass powder is used. The electrically insulating layer having the via-holes is formed with the insulating paste by, for example, screen printing, and the insulating paste is dried and then baked.

The formation of an electrically insulating layer having fine via-holes based on a photolithographic process using a photosensitive insulating resin such as a photosensitive polyimide resin is also known.

Using an insulating paste which is obtained by dispersing glass powder into a photosetting-type organic vehicle, application of the technology for forming an insulating member by a photolithographic process disclosed in, for example, Japanese Patent Laid-Open Nos. 9-110466 and 8-50811 may be possible in order to form an electrically insulating layer having fine via-holes in electronic parts for circuits which require multiple wiring.

Among the above-described conventional technologies, it is difficult in the printing method to form an electrically insulating layer having fine via-holes having a diameter of, for example, less than about 150 μm because of printing feathering due to paste viscosity and printing resolution due to the printing block. Thus, the printing method cannot deal with recent trends towards miniaturization and high-density of circuit substrates and electronic parts for circuits.

According to the method for forming an electrically insulating layer based on a photolithographic process using a photosensitive insulating resin, although fine via-holes having a diameter of, for example, less than 150 μm can be formed, the resulting electrically insulating layer has disadvantages in durability at high temperature and plating characteristics in an acidic plating solution.

On the other hand, in the insulating materials described in Japanese Patent Laid-Open Nos. 9-110466 and 8-50811 which are composed of glass powder dispersed into a photosetting-type organic vehicle and can form an electrically insulating layer having fine via-holes based on a photolithographic process, the contained glass has a relatively low softening point. When an Ag-based material is used in electrodes or transmission lines connecting to the resulting electrically insulating layer, diffusion of Ag into the electrically insulating layer is significantly noticeable and thus the formation of the electrically insulating layer having high reliability is difficult.

SUMMARY OF THE INVENTION

It is an object of the present invention to provide an insulating paste which permits formation of fine via-holes, has excellent high-temperature and plating durability, a low dielectric constant and a high Q value essential for high-frequency circuits, reduced reactivity with other materials such as electrode materials, and which is preferably used for forming an electrically insulating layer.

The preferred embodiment of the present invention provides an insulating paste comprising: an organic vehicle containing an organic binder, a photo-polymerization initiator and a photosetting monomer; and a silicate glass powder having a softening point in a range of about 700° C. to 1,050° C. and having an average particle size in a range of about 0.1 to 5.0 μm, said silicate glass powder being dispersed into said organic vehicle.

The insulating paste in accordance with the present invention is composed of the silicate glass powder dispersed in the organic vehicle containing the photo-polymerization initiator and a photosetting monomer. Therefore, an electrically insulating layer having fine via-holes which is barely formed by a printing process can be formed using a photolithographic process.

Since the insulating paste in accordance with the present invention contains the silicate glass powder, an electrically insulating layer composed of an inorganic glass material is formed after baking. Thus, durability at high-temperature and durability in an acidic plating solution can be improved compared with an electrically insulating layer composed of a resinous material. Since the silicate glass has a softening point in a range of about 700° C. to 1050° C., problems regarding reaction with other materials such as electrode materials which will occur for a softening temperature of less than about 700° C. are solved, and workability is improved by baking at a temperature of about 1,050° C. or less.

In the insulating paste in accordance with the present invention as described above, the silicate glass powder has an average particle size lies with in a range of about 0.1 to 5.0 μm. The average particle size of the silicate glass powder is determined based on Example 3 described later.

An average particle size of about 5.0 μor less can suppress light scattering on the surface of the glass powder when radiating active rays, for example, in an ultraviolet wavelength region (200 to 450 nm). Thus, fine via-holes can be formed so as to achieve a satisfactory aspect ratio, satisfactory resolution, high circularity, and a suppressed taper. At an average particle size of about 0.1 μm or more, the glass particles do not excessively absorb active rays, and thus photo-polymerization is sufficiently completed, resulting in the formation of a dense film.

Preferably, the silicate glass powder in the above described insulating paste comprises a composition represented by $xSiO_2$—$yB_2O_3$—$zK_2O$ where $x+y+z$ is 100 parts by weight and the values z, y and z are on lines or within a region enclosed by lines passing through four points A(65, 35, 0), B(65, 20, 15), C(85, 0, 15) and D(85, 15, 0) on a ternary diagram thereof.

A preferable composition of the silicate glass is determined based on preferred embodiments described below.

By selecting the composition of the silicate glass, the softening point of the glass is controlled to be within a range of about 700° C. to 1,050° C. The glass has, therefore, reduced reactivity with other materials such as electrode materials, and a sintered material is obtainable at a baking temperature of, for example, 900 to 1,050° C. The resulting electrically insulating layer has excellent insulating characteristics and workability. Since the glass has a low specific dielectric constant of less than about 7.0, it is suitable for substrates and electronic parts having high-frequency circuits.

More preferably, the values z, y and z are on lines or within a region enclosed by lines passing through four points E(75, 24.5, 0.5), F(75, 22, 3), G(85, 12, 3) and H(85, 14.5, 0.5) on the ternary diagram. By selecting the composition of the silicate glass, the softening point of the glass is controlled to be within a range of about 750° C. to 940° C. as shown in a first preferred embodiment described later. The glass can, therefore, be baked and sintered at a temperature of 950° C. or less to form an electrically insulating layer. Thus, workability is further improved and reactivity with other materials such as electrode materials can be further reduced.

In the above described insulating paste, preferably, the silicate glass powder has a shape smoothness index represented by $\rho \times SS/CS$ of about 1.0 to 3.0, where SS ($m^2/g$) represents the surface area-to-weight ratio, CS ($m^2/cc$) represents the surface area-to-volume ratio, and $\rho$ represents the density. As the shape smoothness index approaches 1.0, the surface unevenness of the glass particle is reduced.

Methods for reducing the surface unevenness of the glass include spraying glass powder into a high-temperature atmosphere and then quenching it, etching glass powder, and spraying a glass powder solution or sol into a flame atmosphere and then quenching it.

Such a preferable range of the shape smoothness index of the silicate glass powder is determined based on a second preferred embodiment described later.

At a shape smoothness index of about 3.0 or less, the surface unevenness of the glass particle is suppressed. Thus, light scattering of active rays is reduced, resulting in the formation of via-holes having a high circularity and a small taper.

Preferably, the organic binder contained in the organic vehicle is an acrylic copolymer having a carboxylic group and having an ethylenically unsaturated group in a side chain.

By using such an organic binder, an aqueous solution of an organic alkali such as monoethanolamine or of a metallic alkali such as sodium carbonate can be used as a developing solution. If an acrylic polymer having an ester-based side chain and having an ethylenically unsaturated group is used as the organic binder, a harmful organic solvent, such as xylene, isoamyl acetate, butyl acetate, or toluene must be used.

As photo-polymerization initiators, carbon ring compounds, such as anthraquinone, benzophenone, and anthraquinone, which form free radicals during radiation of active rays in the ultraviolet region, are preferably used.

As photosetting monomers, addition polymerization-type ethylenically unsaturated compounds, which are additions polymerized by means of chain propagation by free radicals and form a polymer, are used alone or in combination. Examples of preferably used monomers include pentaerythritol tetracrylates and tetramethacrylates, and hexamethylene glycol diacrylates and dimethacrylates.

For a combination of the organic binder, the photo-polymerization initiator and the photosetting monomer, examples of commercially available photosetting resin compositions include the PMER HC series made by Tokyo Ohka Kogyo Co., Ltd., SK series made by Kawara Ohka Kogyo Co., Ltd., and Opto-ER series made by Nippon Paint Co., Ltd. Other commercially available photosetting resin compositions may be used as long as the organic binder is an acrylic copolymer having a carboxylic group and an ethylenically unsaturated group in a side chain.

The insulating paste in accordance with the present invention can contain additives such as a dispersant, a sedimentation retardant, a defoaming agent, a silane coupling agent and a plasticizer, if necessary.

The insulating paste in accordance with the present invention is used for forming an electrically insulating layer in an electronic part by preferably baking it. More preferably, it is used for forming an electrically insulating layer having via-holes. For example, the electrically insulating layer having via-holes is formed by performing an application step of forming the insulating paste onto a substrate, a drying step, an exposure step, a developing step, a washing step, a drying step and a baking step in that order.

The application step can be performed by a screen-printing, doctor blade or spin coating process. In the exposure step, any exposure method, such as proximity exposure, pressing exposure or contact exposure may be employed. In the developing step, a dipping agitation process, a dipping rocking process, a spraying process, a showering process and a paddling process are usable. Usable developing solutions are aqueous organic alkaline solutions and aqueous metallic alkaline solutions in a concentration range of about 0.1% to 1.0%. Although the baking profile in the baking step is different in response to particle size of the glass powder in the insulating paste and the materials for the substrate and electrode, the baking is generally performed at a temperature of 850° C. to 950° C. for 10 to 80 minutes in air.

Other features and advantages of the present invention will become apparent from the following description of the invention which refers to the accompanying drawing.

DETAILED DESCRIPTION OF PREFERRED EMBODIMENTS

Figure 1:
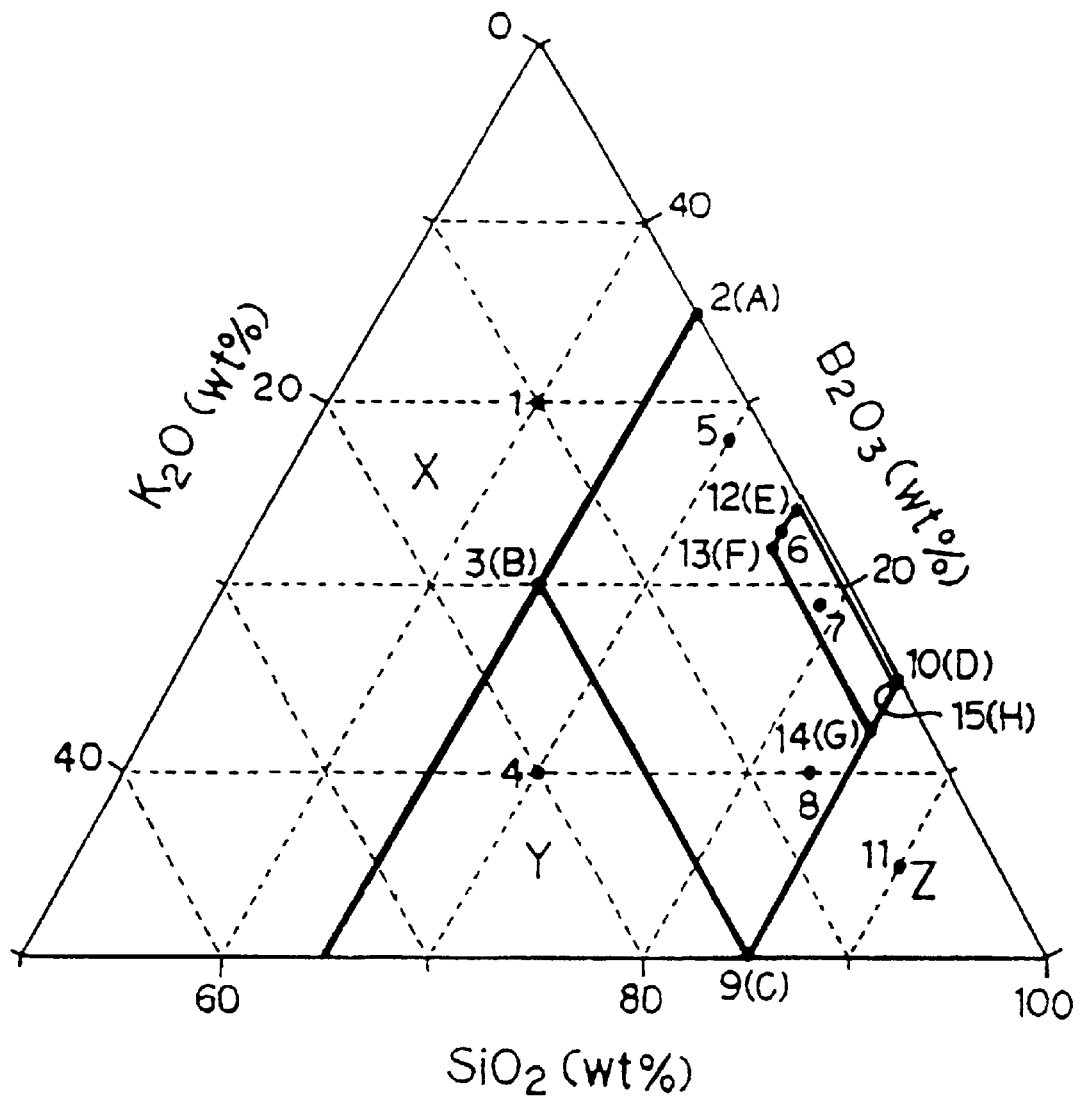
FIG. 1 is a ternary diagram illustrating a preferred range by weight of the composition of a silicate glass contained in an insulating paste in accordance with the present invention.

[First Preferred Embodiment: Composition of Silicate Glass]

In the insulating paste in accordance with the present invention, as described above, preferably the silicate glass comprises a composition represented by $xSiO_2$—$yB_2O_3$—$zK_2O$ where $x+y+z$ is 100 parts by weight and the values z, y and z are on lines or within a region enclosed by lines passing through four points A(65, 35, 0), B(65, 20, 15), C(85, 0, 15) and D(85, 15, 0) on a ternary diagram thereof, as shown in the attached FIG. 1.

In order to achieve the preferred composition and ratio of the silicate glass, $SiO_2$, $B_2O_3$ and $K_2CO_3$ were prepared as starting materials for the glass component of the insulating paste, and mixed so as to obtain the glass compositions having the ratio by weight shown in Table 1. Each of the resulting mixture was melted at a temperature of 1,700° C. to prepare a melt glass. The melt glass was quenched with a cooling roll and pulverized to prepare a glass powder.

The softening point of each glass shown in Table 1 was determined based on "JIS R3104: Method for Measuring Softening Temperature of Glass".

Next, 40 percent by weight of an organic vehicle composed of an acrylic resin dissolved into a terpineol solvent was combined with 60 percent by weight of each glass powder, and these were mixed to prepare a glass paste.

Next, in order to prepare a thick film capacitor using each glass paste, an Ag paste was applied onto an aluminum substrate by screen printing, and baked at 900° C. to form a disk lower conductor layer having a diameter of 8 mm which functions as an electrode of the capacitor. Next, each glass paste was screen-printed on the lower conductor layer and baked at a baking temperature shown in Table 1 to form an electrically insulating layer composed of a disk sintered glass having a diameter of 6 mm on the lower conductor layer. Next, a thermosetting Ag paste was screen-printed onto each electrically insulating layer and cured at 150° C. to form a disk upper conductive layer having a diameter of 4 mm which functions as another electrode of the capacitor.

Using the resulting thick film capacitor for evaluation, the specific permittivity of the sintered glass constituting the electrically insulating layer was evaluated. In detail, the specific permittivity was evaluated under the conditions of 1 MHz, 25° C. and 1 Vrms using an LCR meter. The specific permittivity of each sample is shown in Table 1.

TABLE 1

| Sample No. | $SiO_2$ (wt %) | $B_2O_3$ (wt %) | $K_2O$ (wt %) | Softening point (° C.) | Baking temperature (° C.) | Specific permittivity ($\epsilon_r$) 1 MHz |
|---|---|---|---|---|---|---|
| 1* | 60 | 30 | 10 | 680 | 900 | 5.3 |
| 2 | 65 | 35 | 0 | 700 | 900 | 3.9 |
| 3 | 65 | 20 | 15 | 720 | 900 | 6.2 |
| 4* | 70 | 10 | 20 | 710 | 900 | 7.1 |
| 5 | 70 | 28 | 2 | 720 | 900 | 4.0 |
| 6 | 75 | 23 | 2 | 760 | 900 | 4.0 |
| 7 | 79 | 19 | 2 | 800 | 900 | 3.8 |
| 8 | 83 | 10 | 7 | 950 | 1,050 | 5.6 |
| 9 | 85 | 0 | 15 | 1,050 | 1,050 | 6.2 |
| 10 | 85 | 15 | 0 | 950 | 1,050 | 3.7 |
| 11* | 90 | 5 | 5 | >1,050 | 1,050 | — |
| 12 | 75 | 24.5 | 0.5 | 750 | 900 | 3.8 |
| 13 | 75 | 22 | 3 | 750 | 900 | 4.0 |
| 14 | 85 | 12 | 3 | 930 | 1,000 | 4.0 |
| 15 | 85 | 14.5 | 0.5 | 940 | 1,000 | 3.8 |

The sample numbers with asterisk (*) in Table 1 indicates that the sample has a composition out of the above-mentioned preferred range. The preferred range of the silicate glass composition which is determined based on the softening point and the specific permittivity shown in Table 1 is shown in FIG. 1.

In the region X in which sample 1 (out of the preferred range) falls the softening point of the glass is low, that is, less than 700° C., hence the glass has enhanced reactivity with other materials such as electrode materials. In the region Y in which sample 4 falls the specific permittivity of the glass is high, that is, more than 7.0, and hence the glass is unsuitable for a substrate or electronic part provided with a high-frequency circuit. In the region Z in which sample 11 falls the softening point of the glass is higher than 1,050° C., and hence no sintered glass is obtained when the glass is baked at 1,050° C. Thus, the resulting electrically insulating layer has deteriorated insulating characteristics and poor workability.

In contrast, the softening point of the glass in samples 2, 3, 5 to 10, and 12 to 15 having the preferred composition lies within a range of about 700° C. to 1,050° C. Thus, these glasses are less reactive with other materials such as electrode materials. Sintered glass is obtained at a baking temperature of, for example, 900° C. to 1,050° C. The resulting electrically insulating layer shows excellent insulating characteristics and workability. Since the glass has a low specific permittivity of less than about 7.0, it is suitable for a substrate or electronic part having a high-frequency transmission line.

More preferably, the values z, y and z are on lines or within a region enclosed by lines passing through four points E(75, 24.5, 0.5), F(75, 22, 3), G(85, 12, 3) and H(85, 14.5, 0.5) on the ternary diagram of FIG. 1. Since such selection of the composition of the silicate glass causes the softening point of the glass within a range of 750° C. to 1,000° C. as shown in samples 6, 7 and 12 to 15, the glass can be sintered by baking at a temperature of 900° C. to 1,000° C. in order to form an electrically insulating layer. Thus, workability is further improved, and the reactivity with other materials such as electrode materials is further reduced.

[Second Preferred Embodiment: Shape Smoothness Index of Silicate Glass Powder]

In the present invention as described above, preferably the silicate glass powder has a shape smoothness index represented by $\rho \times SS/CS$ of 1.0 to 3.0, wherein SS ($m^2$/g) represents the surface area-to-weight ratio, CS ($m^2$/cc) represents the surface area-to-volume ratio and $\rho$ represents the density.

In order to determine a preferred range of the shape smoothness index of the silicate glass powder, $SiO_2$, $B_2O_3$ and $K_2CO_3$ were prepared as starting materials for the glass component of the insulating paste, and mixed so as to obtain a glass compositions of $SiO_2/B_2O_3/K_2O$ of 79/19/2 (wt. %). The resulting mixture was melted at a temperature of 1,700° C. to prepare a melt glass. The melt glass was quenched with a cooling roll and pulverized to prepare a glass powder having an average particle size of 3.0 μm. In order to decrease the surface unevenness of the resulting glass particles, the glass powder was sprayed into a high temperature atmosphere and then quenched. By changing the number of the steps for such spraying treatment within a range of 1 to 5, glass powders having various shape smoothness indices as shown in Table 2 were prepared. In detail, the number of the steps for the treatment for decreasing the surface unevenness was 1 for sample 16, 2 for sample 17, 3 for sample 18, 4 for sample 19, and 5 for sample 20.

The shape smoothness index was determined as follows. The surface area-to-weight ratio SS ($m^2$/g) was determined with an inert gas absorption-type automatic surface area meter, the surface area-to-volume ratio CS ($m^2$/cc) was determined with a laser-Doppler-type particle size analyzer, and the specific gravity $\rho$ was determined by a gravimeter. The shape smoothness index $\rho \times SS/CS$ was calculated from these results.

Next, in a yellow fluorescent light chamber, 60 percent by weight of each glass powder in accordance with each of samples 16 to 20 and 40 percent by weight of a photosetting resin composition, PMER HC series made by Tokyo Ohka Kogyo Co., Ltd. containing a photo-polymerization initiator and a photosetting monomer, were mixed and kneaded with a kneader and a three-roll mill to prepare an insulating paste.

The insulating paste in accordance with each of samples 16 to 20 was applied onto the entire surface of a substrate having an electrode by screen printing to form an insulating paste film. A #325 stainless-steel mesh was used as a screen printing block, and the screen printing was performed under the conditions of a squeegee pressure of 5 kg/$cm^3$, a squeegee speed of 50 mm/sec, an attack angle of 70 degrees, and a screen distance of 2.0 mm.

After printing the insulating paste, the substrate was subjected to leveling for 10 minutes or more and then drying for 60 minutes to evaporate the solvent component.

After removing the substrate from the drying unit and confirming that the surface temperature of the substrate reached the room temperature ±2° C. in order that the size of the substrate recovered to the state before drying, the substrate was irradiated with ultraviolet rays of 50 mj/cm² using an exposure unit provided with a photomask to form via-holes having a diameter of 50 μm. A proximity exposure method was employed as the exposure method. After exposition, the unexposed portion was removed by a dipping agitation process in a developing unit. An aqueous 0.5% sodium carbonate solution was used as a developing solution.

After development, the substrate was thoroughly washed, and then dried for 30 minutes in a drying unit to thoroughly evaporate water.

The insulation paste film was baked in a belt-type baking unit at a heating rate of 50° C./min, a maximum baking temperature of 900° C., a holding time of the maximum baking temperature of 10 minutes and a cooling rate of 50° C./min to form an electrically insulating layer on the substrate.

Regarding the electrically insulating layers in accordance with samples 16 to 20, the shape of a 50-μm via-hole, the taper of a 50-μm via-hole, and the dielectric constant and Q value at 1 MHz were evaluated. These results are shown in Table 2. Regarding the shape of the 50-μm via-hole, the via-hole was observed from the top with a microscope, and evaluated as ⊚, ○, Δ, or x in that order from superior to worst. The via-hole evaluated as x shows significant unevenness and is quite different from a circular shape. Regarding the taper of the 50-μm via-hole, the difference in the hole diameters between the top and the bottom of the via-hole cross-section was determined with a microscopic gauge and evaluated as "very large", "large", "small" or "very small".

TABLE 2

| Sample No. | Shape smoothness index | Shape of via-hole | Taper of via-hole | Specific permittivity ($\epsilon_r$) at 1 MHz | Q value at 1 MHz |
|---|---|---|---|---|---|
| 16* | 3.8 | X | Very large | 3.8 | 700 |
| 17* | 3.2 | Δ | Large | 3.8 | 800 |
| 18 | 2.8 | ○ | Small | 3.8 | 1,100 |
| 19 | 1.7 | ⊚ | Very small | 3.9 | 1,400 |
| 20 | 1.3 | ⊚ | Very small | 3.9 | 1,500 |

In Table 2, sample numbers marked with asterisk (*) indicate that the shape smoothness index lies out of the preferred range.

As shown in samples 16 and 17 (outside of the preferred range), when the shape smoothness index is higher than about 3.0, scattering of active rays, for example, active rays in an ultraviolet region, is noticeable on the particle surface due to surface unevenness of the glass particles. Thus, via-holes with high circularity and a small taper are barely formed.

In contrast, as in samples 18, 19 and 20, when the shape smoothness index is about 3.0 or less, the surface unevenness of the glass particle is suppressed, resulting in reduction of scattering of the active rays. Thus, via-holes with high circularity and a small taper can be formed.

It is more preferable that the shape smoothness index be about 1.0 to 2.0. As in samples 19 and 20, when the shape smoothness index is about 2.0 or less, the sintered glass is further dense and the Q value at 1 MHz is higher than 1,100.

[Third Preferred Embodiment: Average Particle Size of Silicate Glass Powder]

The average particle size of the silicate glass powder contained in the insulating paste in accordance with the present invention lies within a range of about 0.1 to 5.0 μm.

In order to determine a preferred range of the average particle size of the silicate glass powder, $SiO_2$, $B_2O_3$ and $K_2CO_3$ were prepared as starting materials for the glass component of insulating paste, and mixed so as to obtain a glass compositions of $SiO_2/B_2O_3/K_2O$ of 79/19/2 (wt. %). The resulting mixture was melted at a temperature of 1,700° C. to prepare a melt glass. The melt glass was quenched with a cooling roll and pulverized to prepare glass powders having an average particle size of 7.3 μm, 5.5 μm, 4.8 μm, 0.1 μm, and 0.05 μm, respectively, as shown in samples 21 to 25, respectively, in Table 3. In order to decrease the surface unevenness of each of the resulting glass particles, the glass powder was sprayed into a high temperature atmosphere and then quenched. The resulting glass powder has a shape smoothness index of 1.7.

Next, in a yellow fluorescent light chamber, 60 percent by weight of each glass powder in accordance with each of samples 21 to 25 and 40 percent by weight of a photo-setting resin composition, PMER HC series made by Tokyo Ohka Kogyo Co., Ltd. containing a photo-polymerization initiator and a photosetting monomer, were mixed and kneaded with a kneader and a three-roll mill to prepare an insulating paste.

The insulating paste in accordance with each of samples 21 to 25 was subjected to a screen printing step, a drying step, an exposure step, a developing step, a washing step, a drying step and a baking step, in that order to form an electrically insulating layer on a substrate as in Example 2.

Regarding the electrically insulating layers in accordance with samples 21 to 25, the shape of a 50 μm via-hole, the taper of a 50-μm via-hole, and the dielectric breakdown voltage (reduced by a 25-μm film thickness) were evaluated. These results are shown in Table 3.

TABLE 3

| Sample No. | Average particle size [μm] | Shape of via-hole | Taper of via-hole | Dielectric breakdown voltage [kV/25 μm] |
|---|---|---|---|---|
| 21* | 7.3 | Δ | Large | 2.26 |
| 22* | 5.5 | Δ | Large | 3.29 |
| 23 | 4.8 | ○ | Small | 5.18 |
| 24 | 0.1 | ⊚ | Very small | 5.54 |
| 25* | 0.05 | Δ | Large | 6.32 |

In Table 3, samples with asterisk (*) indicate that the average particle size of the silicate glass powder lies out of the range of about 0.1 to 5.0 μm.

As in samples 21 and 22, when the average particle size is higher than about 5.0 μm, the dielectric breakdown voltage decreases as shown in Table 3.

As in sample 25, when the average particle size is less than about 1.0 μm, the glass particles excessively absorb the active rays. Sufficient light, therefore, does not reach the substrate surface and photo-polymerization is inhibited. Thus, the film is not dense and will peel off during developing. As shown in Table 3, it is impossible to form a via-hole having high circularity and a small taper.

In contrast, when the average particle size lies within a range of about 0.1 to 5.0 μm, as in samples 23 and 24, a high dielectric breakdown voltage is achieved, and a via-hole having high circularity and a small taper is formed.

While the invention has been particularly shown and described with reference to preferred embodiments thereof, it will be understood by those skilled man in the art that the forgoing and other changes in form and details may be made therein without departing from the spirit of the invention.

What is claimed is:

1. An insulating paste comprising a dispersion of
an organic vehicle containing an organic binder, a photopolymerization initiator and a photosetting monomer; and
a silicate glass powder having a softening point in a range of about 700° C. to 1,050° C. and having an average particle size in a range of about 0.1 to 5.0 μm.

2. The insulating paste according to claim 1, wherein said silicate glass powder comprises a composition represented by $xSiO_2$—$yB_2O_3$—$zK_2O$ where x+y+z is 100 parts by weight and the values x, y and z are on lines or within a region enclosed by lines passing through points A(65, 35, 0), B(65, 20, 15), C(85, 0, 15) and D(85, 15, 0) on a ternary diagram thereof.

3. The insulating paste according to claim 2, wherein the values x, y and z are on lines or within a region enclosed by lines passing through points E(75, 24.5, 0.5), F(75, 22, 3), G(85, 12, 3) and H(85, 14.5, 0.5) on a ternary diagram thereof.

4. The insulating paste according to claim 3, wherein said silicate glass powder has a shape smoothness index ρ×SS/CS of about 1.0 to 3.0, where SS ($m^2$/g) represents the surface area-to-weight ratio, CS ($m^2$/cc) represents the surface area-to-volume ratio, and ρ represents the density.

5. The insulating paste according to claim 4, wherein said silicate glass powder has a shape smoothness index ρ×SS/CS of about 1.0 to 2.0.

6. The insulating paste according to claim 2, wherein said silicate glass powder has a shape smoothness index ρ×SS/CS of about 1.0 to 3.0, where SS ($m^2$/g) represents the surface area-to-weight ratio, CS ($m^2$/cc) represents the surface area-to-volume ratio, and ρ represents the density.

7. The insulating paste according to claim 1, wherein said silicate glass powder has a shape smoothness index ρ×SS/CS of about 1.0 to 3.0, where SS ($m^2$/g) represents the surface area-to-weight ratio, CS ($m^2$/cc) represents the surface area-to-volume ratio, and ρ represents the density.

8. The insulating paste according to claim 7, wherein said organic binder is an acrylic polymer comprising a carboxylic group and an ethylenically unsaturated group in a side chain.

9. The insulating paste according to claim 6, wherein said organic binder is an acrylic polymer comprising a carboxylic group and an ethylenically unsaturated group in a side chain.

10. The insulating paste according to claim 5, wherein said organic binder is an acrylic polymer comprising a carboxylic group and an ethylenically unsaturated group in a side chain.

11. The insulating paste according to claim 4, wherein said organic binder is an acrylic polymer comprising a carboxylic group and an ethylenically unsaturated group in a side chain.

12. The insulating paste according to claim 3, wherein said organic binder is an acrylic polymer comprising a carboxylic group and an ethylenically unsaturated group in a side chain.

13. The insulating paste according to claim 2, wherein said organic binder is an acrylic polymer comprising a carboxylic group and an ethylenically unsaturated group in a side chain.

14. The insulating paste according to claim 1, wherein said organic binder is an acrylic polymer comprising a carboxylic group and an ethylenically unsaturated group in a side chain.

* * * * *